(12) United States Patent
Sun et al.

(10) Patent No.: US 10,223,471 B2
(45) Date of Patent: Mar. 5, 2019

(54) WEB PAGES PROCESSING

(71) Applicant: International Business Machines Corporation, Armonk, NY (US)

(72) Inventors: Xingzhi Sun, Beijing (CN); Qiming Teng, Beijing (CN); Linhao Xu, Beijing (CN); Yiqin Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/724,855

(22) Filed: May 29, 2015

(65) Prior Publication Data

US 2015/0379156 A1    Dec. 31, 2015

(30) Foreign Application Priority Data

Jun. 30, 2014  (CN) .......................... 2014 1 0307358

(51) Int. Cl.
*G06F 17/00*   (2006.01)
*G06F 17/30*   (2006.01)
*G06F 17/24*   (2006.01)

(52) U.S. Cl.
CPC ...... *G06F 17/30893* (2013.01); *G06F 17/248* (2013.01); *G06F 17/30292* (2013.01)

(58) Field of Classification Search
CPC ............. G06F 17/30893; G06F 17/248; G06F 17/30292; G06F 17/914; G06F 17/30905; G06F 17/36289

(Continued)

(56) References Cited

U.S. PATENT DOCUMENTS 6,996,589 B1 *  2/2006  Jayaram ............ G06F 17/30569
7,225,411 B1 *  5/2007  Stoner ............... G06F 17/30569
                                                    707/999.003

(Continued)

FOREIGN PATENT DOCUMENTS

CN    103678347 A    3/2014
CN    103744942 A    4/2014
TW    200933393 A    8/2009

OTHER PUBLICATIONS

Flavio Chierichetti et al., "Finding the Jaccard Median", Jan. 17, 2010, Society for Industrial and Applied Mathematics, Soda Proceedings of the twenty-first annual ACM-SIAM symposium on Discrete Algorithms, pp. 293-311.*

(Continued)

*Primary Examiner* — Manglesh M Patel
(74) *Attorney, Agent, or Firm* — Anthony M. Pallone

(57) ABSTRACT

The present invention provides a method and apparatus for processing a web page. The method comprises: identifying a plurality of source data schema elements of the web page; determining an attribute similarity between one source data schema element among the plurality of source data schema elements and one target data schema element among a plurality of target data schema elements based on attributes of the data schema elements; and mapping the source data schema element to the target data schema element for generating a target web page in response to the attribute similarity being higher than a predetermined threshold. Through this method, the data schema elements or template language elements in the web page may be transformed efficiently and conveniently, so as to transform the web page, and to enhance the transformation efficiency.

17 Claims, 8 Drawing Sheets

(58) Field of Classification Search
USPC .................................... 715/234, 239, 200
See application file for complete search history.

(56) References Cited

U.S. PATENT DOCUMENTS

| | | | | |
|---|---|---|---|---|
| 7,458,021 | B2* | 11/2008 | Balasubramanyan | ........................ |
| | | | | G06F 17/248 |
| | | | | 715/235 |
| 7,490,112 | B1 | 2/2009 | Sethuraman et al. | |
| 7,873,899 | B2* | 1/2011 | Singh ................ | G06F 17/30569 |
| | | | | 715/234 |
| 8,234,312 | B2* | 7/2012 | Thomas ............ | G06F 17/30569 |
| | | | | 707/803 |
| 8,407,598 | B2 | 3/2013 | Burton | |
| 8,589,366 | B1* | 11/2013 | Younes ............. | G06F 17/30864 |
| | | | | 707/602 |
| 8,661,338 | B2* | 2/2014 | Purvis .................... | G06T 11/60 |
| | | | | 382/112 |
| 8,706,771 | B2* | 4/2014 | Gass .................. | G06F 9/44536 |
| | | | | 707/803 |
| 2002/0184213 | A1* | 12/2002 | Lau .................. | G06F 17/30569 |
| 2004/0194016 | A1 | 9/2004 | Liggitt | |
| 2004/0199905 | A1* | 10/2004 | Fagin .................. | G06F 17/2247 |
| | | | | 717/136 |
| 2007/0239742 | A1* | 10/2007 | Saha ................ | G06F 17/30731 |
| 2008/0313201 | A1* | 12/2008 | Bishop .................. | G06F 3/1214 |
| 2011/0154185 | A1 | 6/2011 | Kern et al. | |

OTHER PUBLICATIONS

Preston Gralla, "How the Internet Works", 2004, Que Publishers, Seventh Edition, pp. 144-145.*
Gonzalo Navarro, "A Guided Tour to Approximate String Matching", Mar. 2001, ACM Computing Surveys, vol. 33, No. 1, pp. 31-88.*
Navarro, "A Guided Tour to Approximate String Matching", published Mar. 2001 by ACM Computing Surveys, vol. 33 No. 1, pp. 31-88.*
Gralla, "How the Internet Works", published 2004 by Que Publishing, 7$^{th}$ Edition.*
CN application 201410307358.9, filed Jun. 30, 2014, entitled: "Web Pages Processing", 28 pages.
Estievenart et al. "A Tool-Supported Method to Extract Data and Schema From Web Sites", Institut d'Informatique, University of Namar, rue Grandgagnage, 21-B5000 Namur—Belgium, pp. 1-9.

* cited by examiner

```
<> div class=pane_title
    <> bean:size name=products
    <> bean:write name=size
 form id=productListForm
    table id=product_list_table
       <> tr
          <> th
             <> bean:message key=label.product.id
          <> th
             <> bean:message key=label.product.name
          <> th
             <> bean:message key=label.product.provider.a
          <> th
             <> bean:message key=label.product.provider.b
          <> th
             <>    bean:message key=label.product.provider.c
       <> logic:iterate name=products
          <> tr class=<logic:equal name="product" property="isNew"
             <> td
                <> bean:write name=product property=id
             <> td
                <> bean:write name=product property=name
             <> td
                <> bean:write name=product property=priceA
             <> td
                <> bean:write name=product property=priceB
             <> td
                <> bean:write name=product property=priceC
```

FIG. 4

WEB PAGES PROCESSING

FIELD

Embodiments of the present invention relates to the field of processing a computer application and more specifically, to a method and apparatus for processing a web page.

BACKGROUND

With the rapid development of network and computer application technologies, a web-based application becomes a major form of computer-based applications. In a web page, data is usually rendered through a web template. For example, a web template system uses a template processor to combine web templates to form a finished web page. The template processor is designed to combine a template and a data model to generate a finished web page. Template language is the language that the template are written in. Due to various requirements and rapid extended web technologies, many template systems spring out, such as Django, JSP, and Struts. On the other hand, data in a web page is deposited through data schema, which facilitates constructing inherent connections between data.

Because technologies of web pages, particularly dynamic web pages are updated quickly, it is frequently required to update and upgrade web pages, which may not only comprise update of relevant web page template languages, but also may include update of relevant data schemas. In the traditional upgrade methods, because corresponding connections between templates/data schema of the source web page and target templates and data schema cannot be established, such update and upgrade can only be performed manually, which is time-consuming and energy-consuming, and also inefficient.

SUMMARY

In order to solve the above drawbacks existing in the prior art, the present invention provides the following solution.

According to a first aspect of the present invention, there is provided a method for processing a web page, including: identifying a plurality of source data schema elements of the web page; determining an attribute similarity between one source data schema element among the plurality of source data schema elements and a target data schema element among a plurality of target data schema elements based on attributes of the data schema elements; and mapping the source data schema element to the target data schema element in response to the attribute similarity being higher than a predetermined threshold, to generate a target web page.

According to a second aspect of the present invention, there is provided an apparatus for processing a web page, including: a first identifying unit configured to identify a plurality of source data schema elements of the web page; an attribute similarity determining unit configured to determine an attribute similarity between one source data schema element among the plurality of source data schema elements and a target data schema element among a plurality of target data schema elements based on attributes of the data schema elements; and a first mapping unit configured to map the source data schema element to the target data schema element in response to the attribute similarity being higher than a predetermined threshold, to generate a target web page.

According to the embodiments of the present invention, the data schema elements or template language elements in the web page may be transformed efficiently and conveniently, such that the web page may be transformed, and the transformation efficiency is enhanced.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 shows a DOM tree derived from resolving the web page of FIG. 3 according to an exemplary embodiment of the present invention;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
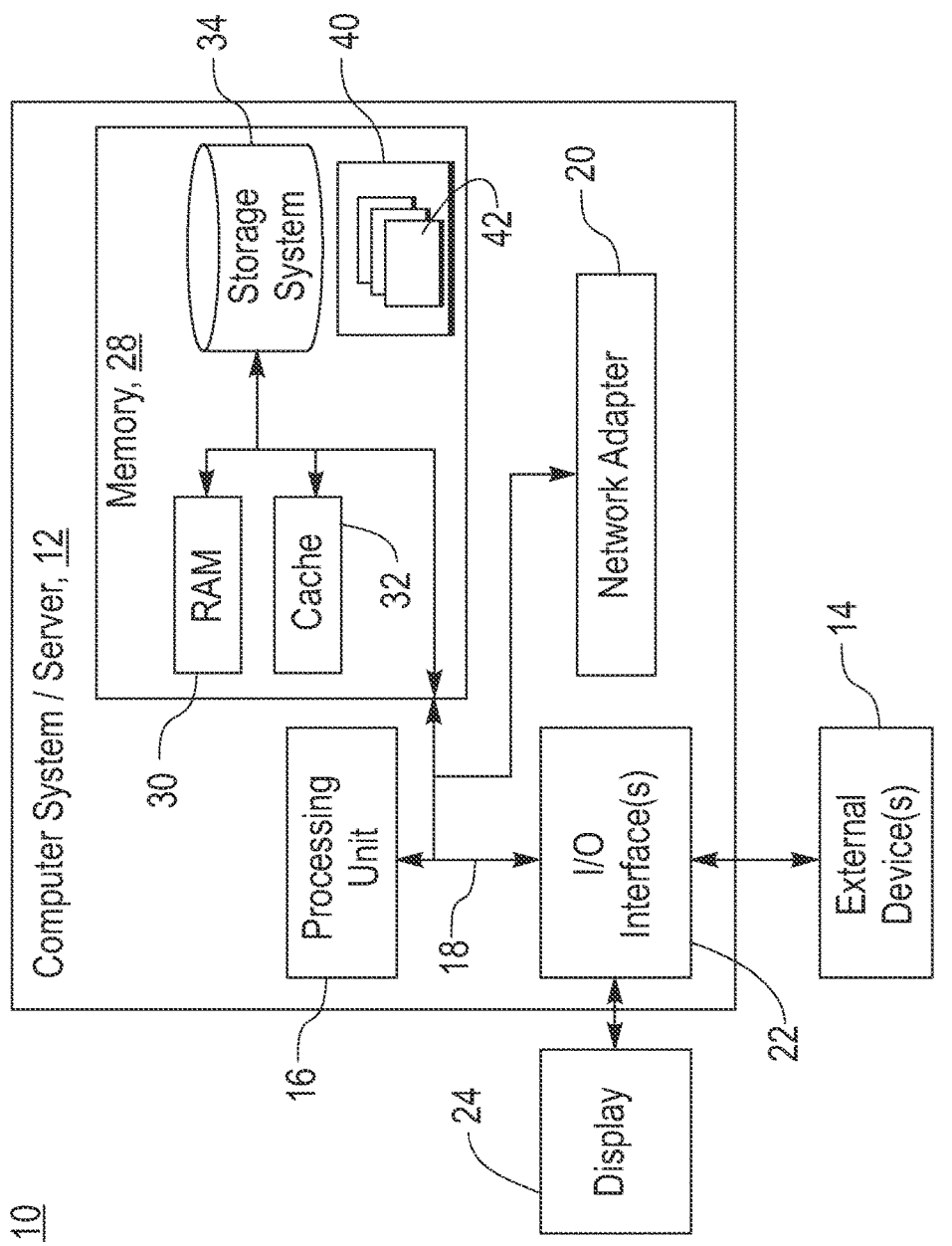
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device 10. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
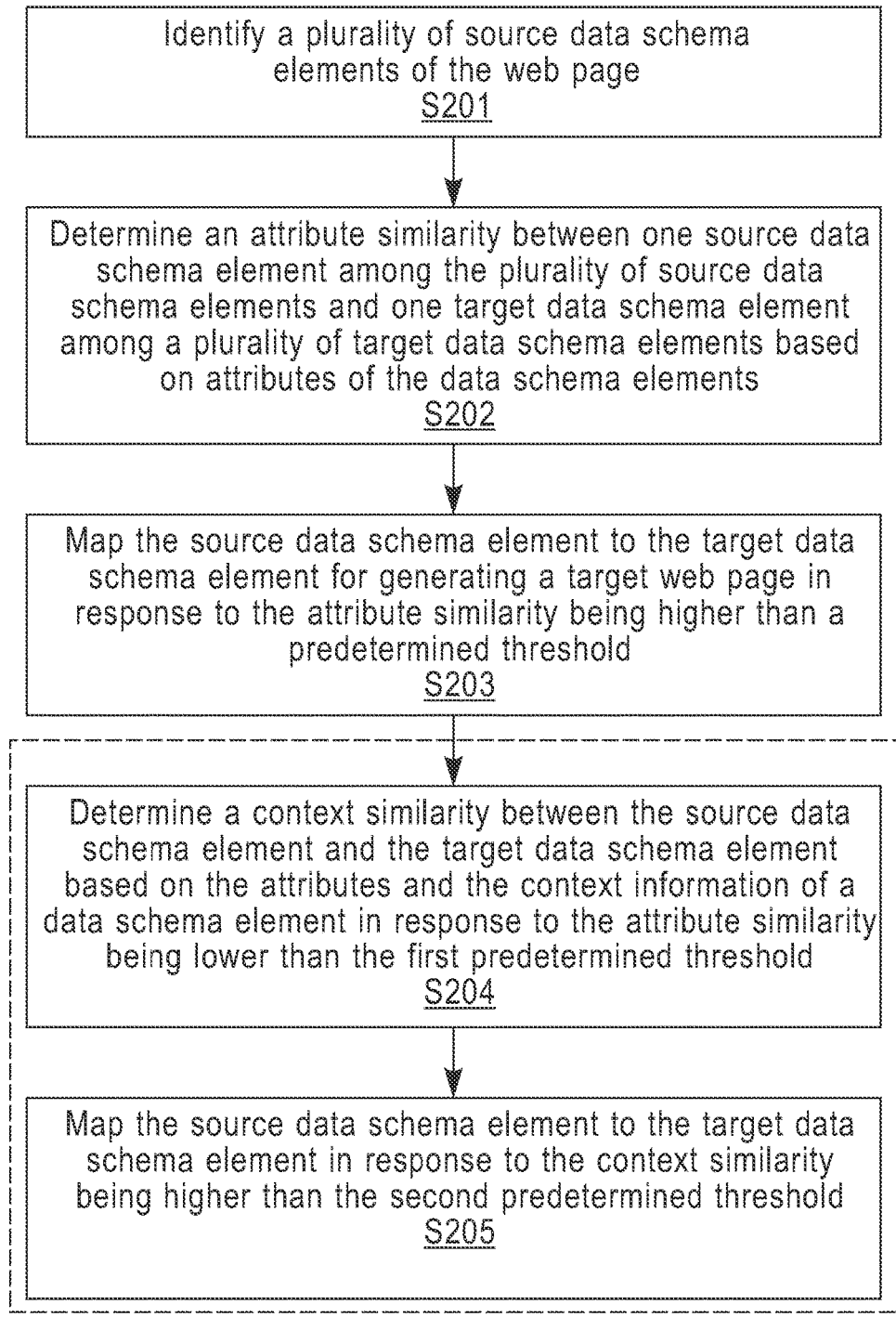
FIG. 2 shows a flow diagram of a method for processing a web page according to exemplary embodiments of the present invention.

Now, with reference to FIG. 2, in which a flow diagram of a method 200 for processing a web page according to an exemplary embodiment of the present invention is presented. According to the method 200, in step S201, a plurality of source data schema elements of a web page are first identified. Then, in step S202, an attribute similarity between one source data schema element among the plurality of source data schema elements and one target data schema element among a plurality of target data schema elements is determined based on attributes of the data schema elements. Next, in step S203, the source data schema element is mapped to the target data schema element in response to the attribute similarity being higher than a predetermined threshold.

Figure 3:
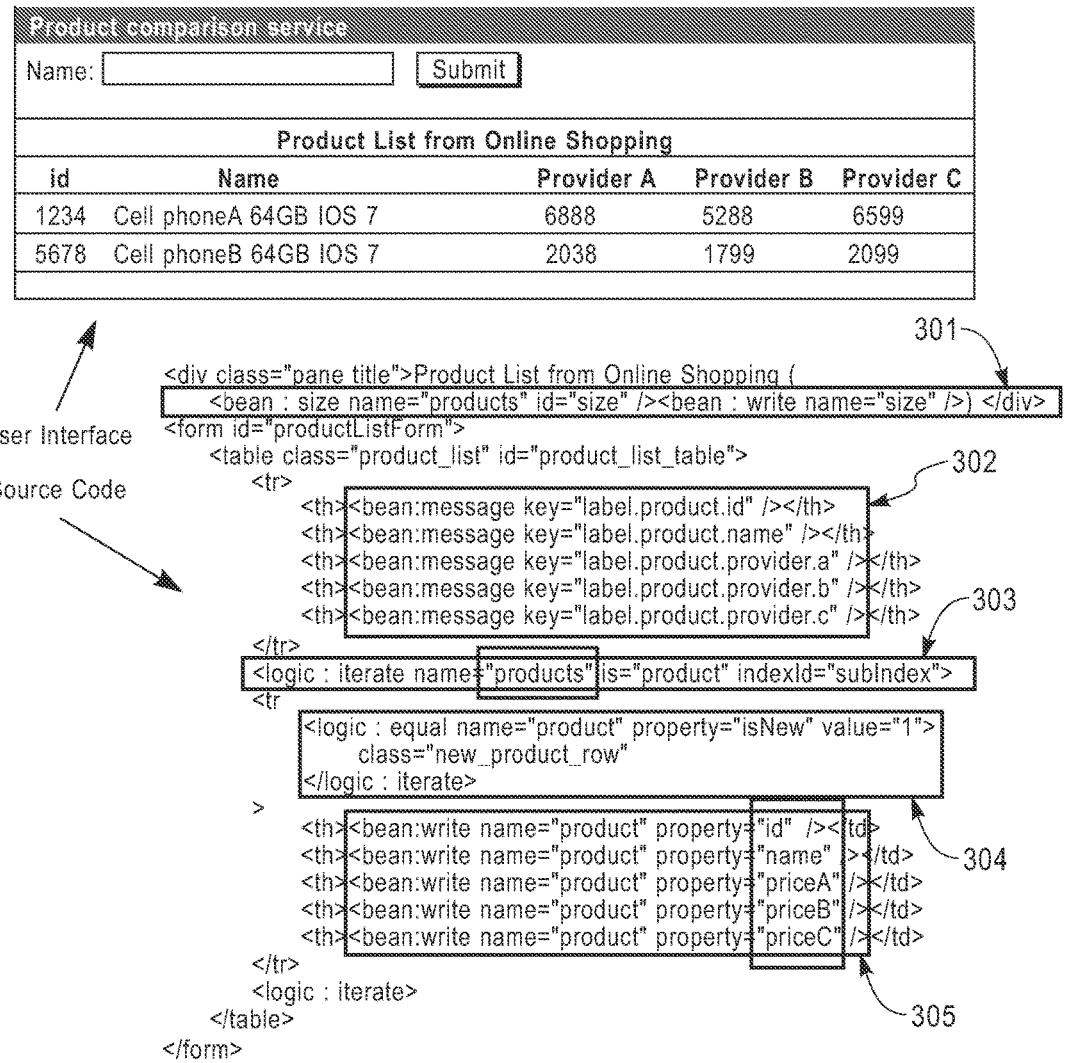
FIG. 3 shows an exemplary web page for performing a product comparison service.

As previously mentioned, a web page (particularly a dynamic HTML page) usually comprises a template language for rendering data (a data element associated therewith is called a "template language element" herein) and a data schema associated with the data per se (a data element associated therewith is called "a data schema element" herein). The transformation of the web page (e.g., update, upgrade, etc.) may not only comprise a transformation of a data schema element therein, but also may comprise a transformation of a template language element therein, or transformations of both. FIG. 3 shows an exemplar web page (with JSP as the template language) for performing a product comparison service. Those skilled in the art should understand, although it is shown as a JSP web page in FIG. 3, a web page of other type is also included within the concept of the present invention, and the present invention is not limited thereto. Further, it should be noted, at the upper part of FIG. 3 is shown a user interface of the product comparison service, while at the lower part is shown a corresponding bottom layer source code. The Web page herein refers to its source code, unless otherwise indicated. Since a template language has a certain language specification, it is easy to find it in the web page. For example, as shown in FIG. 3, the several elements headed by "<bean:" in 301, 302, and 305 are template language elements; the several elements headed by "<logic:" in 303 and 304 are template language elements. Further, the respective attributes "id," "name," "priceA," "priceB" and "priceC" of "products" in 303 and "products" in 305 are data schema elements.

In practice, in order to facilitate identifying template language elements and data schema elements from a web page, the web page is first resolved into a document object model (DOM), thereby deriving a tree hierarchical structure of the web page, for example. FIG. 4 shows a DOM tree derived by resolving the web page shown in FIG. 3. Based on the resolved DOM tree, template language elements can be easily identified, and then the data schema elements can be identified. As shown in FIG. 4, template language elements may be found based on the specification of the template language through traversing the DOM tree. For example, based on the language specification, contents headed by "bean:" usually belong to template language elements; then, the template language elements in solid-line blocks in FIG. 4 may be identified. Next, data schema elements may be further identified from the template language elements based on the specification of the template language. For example, based on the language specification, the attribute of "name" in the template language elements is a data schema element; then the data schema element "products" can be easily found from the template language element "bean:size name=products" in the first block of FIG. 4. Those skilled in the art should understand that resolving a web page to derive a DOM tree is only an optional step for facilitating derivation of the template language elements and data schema elements. Any other possible manners in the prior art may be applied to derive the template language elements and the data schema elements. The present invention is not limited in this regard.

In addition, alternatively, context information about the data schema element may also be identified for each data schema element. The context information may be at least based on the background information of the data schema element or its associated information. When the web page is a HTML page, the context information, for example, may comprise a HTML element (hereinafter referred to as E) where the data schema element is located or a further HTML element (hereinafter referred to as Rs) associated with the HTML element, and alternatively, the context information may also comprise relevant data in a HTML element. In the case of resolving a web page into a DOM tree, for a certain data schema element as a leaf node, its context information may also comprise its parent node, as an example, or ancestor nodes labeled as title or header, and other information. In an implementation, as an example, E may be found at the following location: text content surrounding the data schema element in the web page, general attributes (e.g., id, name, and class). Further, for some data schema elements, E may also be found in a specific attribute, e.g., href of <a>, alt of <img>, the value of <input>, and the object for <label>. For a data schema element as a leaf node in the DOM tree, the attribute value and content of sibling nodes of the node may be defined as E. Similarly, Rs may be found considering the following rules:

1. If the data schema element is in <td>: search in a table header unit in the same column;
2. For the data schema element being in <fieldset>: search in <legend>;
3. For the data schema element with the attribute "name": search, in <label>, information identical to the <for> value;
4. Elements of <h1>~<h6> above;
5. For the data schema element in <option>: search an element whose parent node is <select>.

Figure 5:
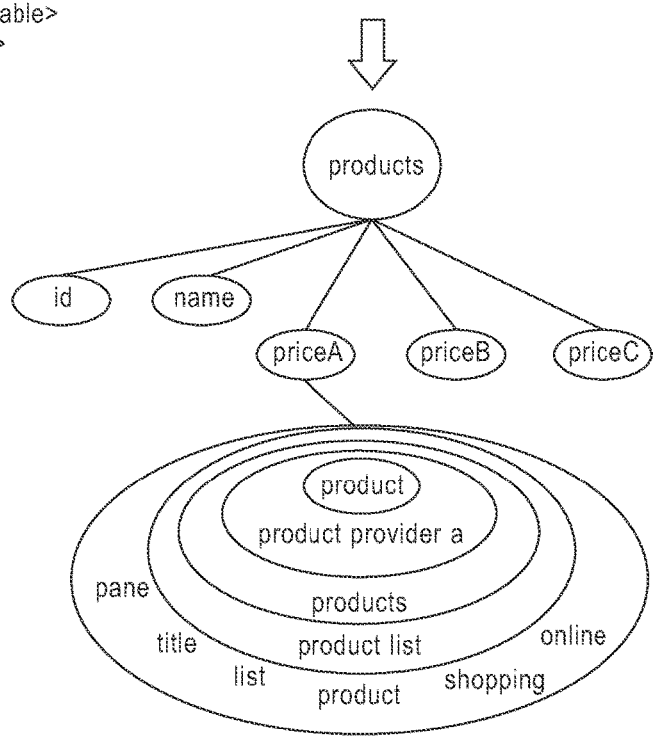
FIG. 5 shows a schematic step of deriving context information of a certain data schema element in the web page of FIG. 3.

FIG. 5 shows a schematic step of obtaining context information of a certain data schema element in the web page of FIG. 3. As shown in FIG. 5, respective sub-nodes (id, name, priceA, priceB, and priceC) of the root node products are derived from respective attributes of product in the web page of FIG. 3, wherein the context information (as shown in a plurality of oval blocks infra) identified by the data schema element 501 "priceA" may be derived in the following manner:

1. First, background information or associated information in the HTML element 502 where the data schema element 501 is searched in the web page, e.g., keyword (usually "a meaningful word", e.g., "product" (i.e., E mentioned above) is found;
2. Then, since the data schema element 501 is in <td>, based on the search rules for the Rs, keywords may be searched in the header unit of the same column, i.e., in 503, e.g., "product," "provider," and "a" are found;
3. Next, keywords are searched in the upper level table header 504 of the data schema element 501, e.g., "products" and "product" are found. Alternatively, since the former contains the latter in terms of character string, it is allowed to only record the former as context information.
|4. Then, keywords are searched in the further upper-level table header 505, e.g., "product" and "list" are found;
5. Further, keywords are searched in the still further upper-level table header 506, e.g., "pane," "title," "list," "product," "shopping," "online," etc., are found.

What are illustrated above are only schematic steps of obtaining a certain data schema element from a web page. Those skilled in the art should understand that the above steps are non-exhaustive, and some steps may be added or deleted to obtain an appropriate context. Additionally, it may be seen that respective context information of the element 501 "priceA" may be divided into hierarchies based on their association levels. For example, in FIG. 5, it is generally believed that the context information "product" and the like as found in 502 is more associated than the context information "pane" and the like as found in 506. In an alternative implementation, the context information may also be tripped according to the needs in consideration of whether it is an HTML markup name and attribute name, whether it is a template language markup name or attribute name, etc.

Return to step S201 of FIG. 2, when it is needed to transform the source web page into a template web page, for transformation of the data schema element portion therein, attribute similarities between the source data schema element and the respective target data schema elements of a plurality of pre-provided target data schema elements are first calculated based on the attributes of the data schema elements, respectively. Attributes usually include attributes of a data schema element per se and/or attributes inherited thereby (which may be a name attribute, in particular). For example, in FIG. 5, the attributes of the node priceA may contain the name attribute "priceA" of itself and the name attribute "products" of the parent node inherited thereby.

Figure 6:
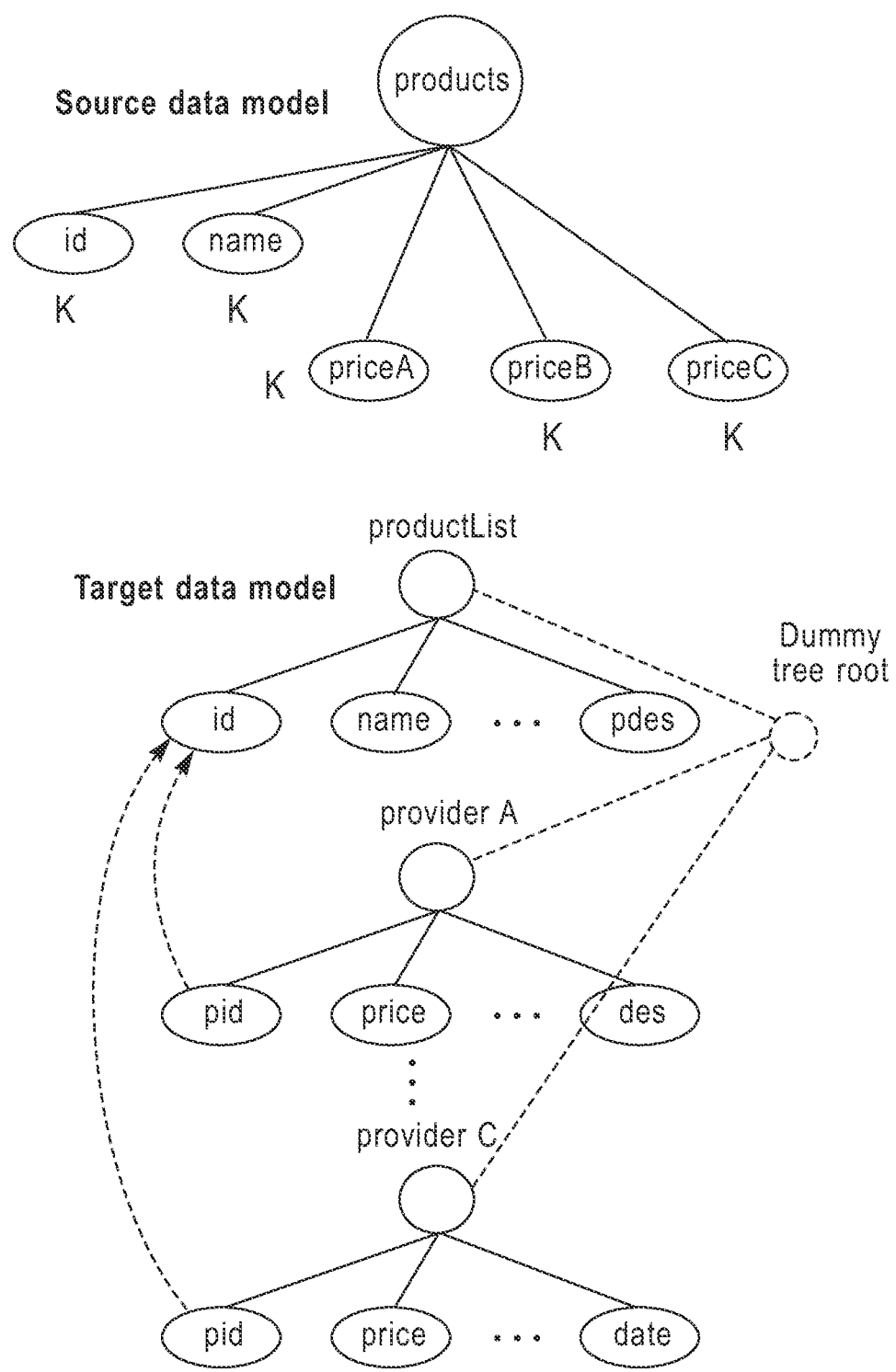
FIGS. 6 and 7 shows a schematic diagram of a tree structure of a source data schema element and a tree structure of a target data schema element, as well as their relationship, according to exemplary embodiments of the present invention.
Figure 7:
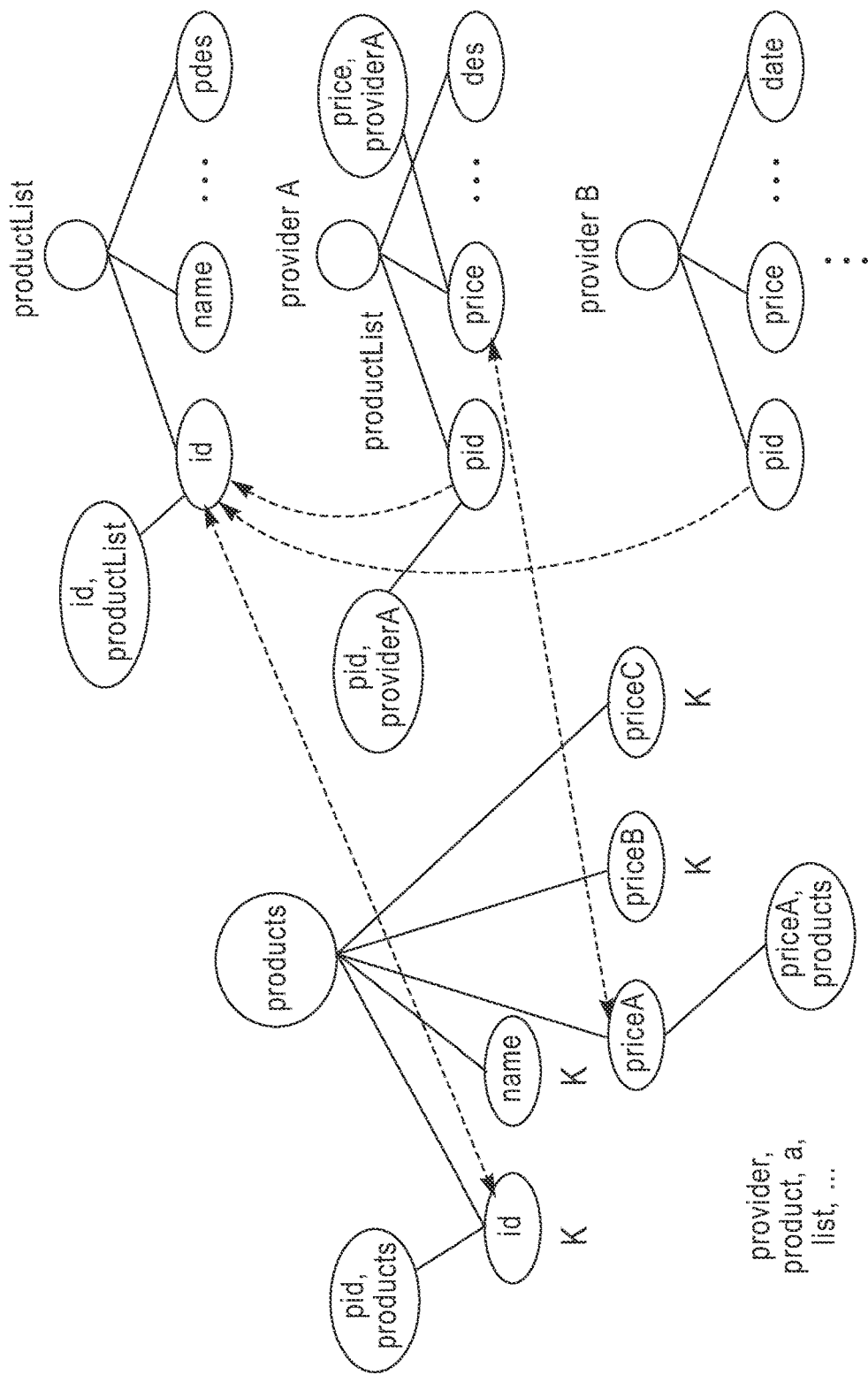

FIGS. 6 and 7 are schematic diagrams showing a tree structure of a source data schema element and a tree structure of a target data schema element, as well as their relationships. As shown in FIG. 6, the source data model, representative of source data schema elements, may be derived through resolving a source web page. The target data model is represented as a tree, wherein each leaf node is associated with a key word. Similarly, a target data model represents a target data schema element, which, for example, may be expressed as a relation model composed of a table and attributes (not shown). The data model D may also be expressed in a tree form, wherein each first-level node corresponds to the table, and the second-level nodes are attributes of their parent nodes (table). A link between two leaf nodes represents a foreign key relationship between them. In order to map respective nodes (data schema elements) in the source data model to respective nodes in the data model D, similarity between nodes may be reflected by calculating attribute similarity between nodes. In order to calculate the attribute Similarity1 (A, B) between any source data schema element A (not shown) and any target data schema element B (not shown), some terms are first defined:

1. Edition distance eDis between two words: the minimum number of single-character edits (including insert, delete, replace) required to change one word to another word. For example, eDis (products, productlist)=3, which is because at least 3 characters ("L," "I," "t") have to be inserted to transform the word "products" into the word "productList."
2. Distance Dis(w, S) from the word w to a word set S: the minimum edition distance between any word from w to S. for example, Dis(products, {productList, name})=3.

Based on the above definitions, the attribute similarity between a source data schema element and a target data schema element is determined at least partially based on the following: a distance between each attribute in a set of attributes of the source data schema element and a set of attributes of the target data schema element, a distance between each attribute in a set of attributes of the target data schema element and a set of attributes of the source data schema element, and a character string length of names of all attributes in the set of attributes of the source data schema element and the set of attributes of the target data schema element.

For example, in implementation, a similarity Similarity1 (A, B) between the source data schema element A and the target data schema element B may be calculated through Equation (1):

$$\text{Similarity1}(A, B) = 1 - [\sum\nolimits_{w \text{ in } WA} Dis(w, WB) + \sum\nolimits_{w \text{ in } WB} Dis(w, WA)]$$
$$/[2 \times \sum\nolimits_{w \text{ in } WA \text{ or } WB} StringLength(w)]$$

wherein WA and WB are sets of attributes of A and B, respectively, while StringLength(w) denotes the character string length of w.

For example, with reference to FIG. 7, when the source data schema element A is to be mapped to an appropriate target data schema element, similarity between the source data schema element A and respectively target data schema elements is calculated, respectively. According to Equation (1), suppose the similarity between the source data schema element A and the target data schema element B is:

$$\text{Similarity1}(A, B) = 1 - \frac{0 + 3 + 0 + 3}{[2*(2+8+2+11)]} = 1 - \frac{6}{46} = 0.87$$

wherein A: {id, products}, B: {id, productList}, id, and products are attributes of A, while id and productList are attributes of B.

Likewise, for the source data schema element C (not shown), its similarity with respective target data schema elements is calculated, respectively. According to Equation (1), its similarity with the target data schema element D is:

$$\text{Similarity1}(C, D) = 1 - \frac{1 + 6 + 1 + 6}{[2*(6+8+5+9)]} = 1 - \frac{14}{56} = 0.75$$

wherein C: {priceA, products}, D: {price, providerA}, priceA and products are attributes of C, while price and providerA are attributes of D.

If the value of the first predetermined threshold is preset to 0.8, then the source data schema element A is mapped to the target data schema element B; at this point, the target data schema to be mapped has been found, and it would be unnecessary to continue comparison regarding A. On the contrary, since the attribute similarity between C and D is lower than the first predetermined threshold 0.8, C is not mapped to D now.

Those skilled in the art should understand that the above Equation (1) is a specific implementation of calculating similarity between attributes, which cannot act as a limitation to the present invention. Any other methods of calculating similarity between attributes in the prior art should fall within the concept of the present invention.

Return to FIG. 2. Method 200 may also alternatively comprise a step S204 to determine a context similarity between a source data schema element and a target data schema element based on attributes and context information of the data schema element in response to the attribute similarity being lower than the first predetermined threshold; and step S205 to map the source data schema element to the target data schema element in response to the context similarity being higher than the second predetermined threshold. It should be noted that steps S204 and S205 in the dotted-line blocks are not compulsory, but optional. For example, it is totally possible to perform transformation of a data schema element in the case of satisfying the threshold condition only by performing steps S201-S203. In this case, when the attribute similarity is lower than the first predetermined threshold, the target data schema element may be changed to recalculate the attribute similarity. It should be further noted that the first predetermined threshold and the second predetermined threshold here may be identical or different, which may be set as needed, respectively.

Considering the context information (i.e., steps S204 and S205), a similarity Similarity2(A,B) between the source data schema element A and the target data schema element B may be calculated comprehensively through Equation (2):

$$\text{Similarity2}(A,B) = 1 - [\Sigma_{w \text{ in } WB} Dis(w, WA)] /$$
$$[2 \times \Sigma_{w \text{ in } WB} StringLength(w)]$$

wherein WA and WB are attributes and sets of context information of A and B, respectively, and StringLength(w) denotes the character string length of w.

Likewise, those skilled in the art should understand that the above Equation (2) is a specific implementation of calculating a similarity between attributes, which cannot act as a limitation to the present invention. Any other method of calculating a similarity between attributes in the prior art falls within the concept of the present invention.

Still with FIG. 7 as an example, continue considering source data elements C and D. When the attribute similarity between C and D is lower than the first predetermined threshold 0.8, the context information "provider, product, a, list, . . . " of C and the context information "productList" of D are introduced to further calculate the context similarity therebetween according to Equation (2):

$$\text{Similarity2}(C, D) = 1 - \frac{1 + 1 + 3}{[2*(5+9+11)]} = 1 - \frac{5}{50} = 0.9$$

wherein C: {priceA, products, provider, . . . }, B: {price, providerA, productList}, priceA and products are attributes of C; provider, . . . is context information of C (which may be added or reduced as required); price and providerA are attributes of D, and productList is context information of D.

If the value of the second predetermined threshold is likewise pre-set to 0.85, because the obtained context similarity 0.9 is higher than the second predetermined threshold, the source data schema element C may be mapped to the target data schema element D in this case, and search of a target data schema element with respect to C is terminated.

Figure 8:
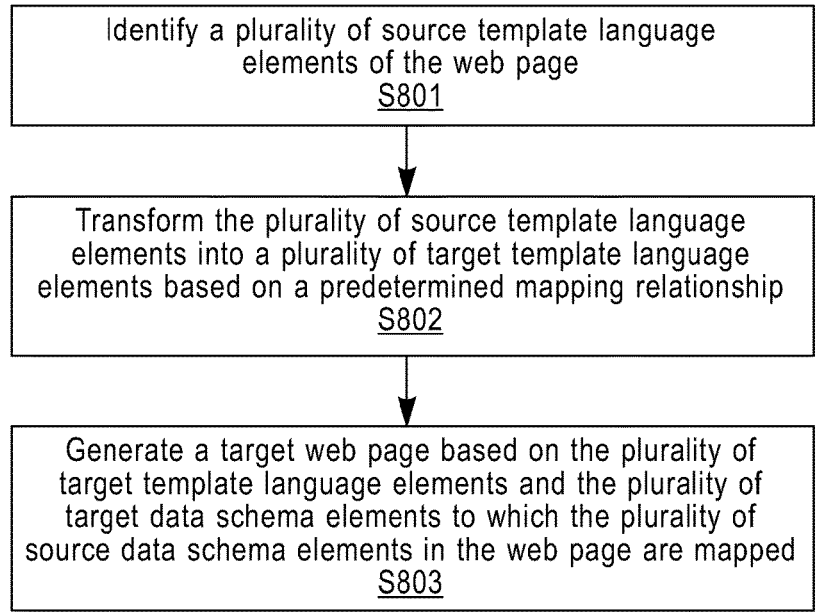
FIG. 8 shows a flow diagram of a method for updating a web page according to embodiments of the present invention.

As mentioned above, a data schema element in a source Web page may be transformed through steps S201-S203 or S201-S205 as shown in FIG. 2, respectively, thereby obtaining an updated target data schema element. When the transformation of the source web page only involves a data schema element, a target web page may be generated based on source template language elements of the source web page and the transformed target data scheme elements. In addition, transformation of a web page may also include transformation of template language elements in the web page. FIG. 8 shows a flow diagram 800 of a method for updating a web page according to the embodiments of the present invention. The flow diagram 800 comprises step S801 of identifying a plurality of source template language elements of a web page; step S802 of transforming a template language element of the web page into a target template language element based on the predetermined mapping relationship; and step S803 of generating a target web page based on the target template language elements and the target data schema elements to which the source data schema elements in the web page are mapped. Compared with the transformation of a data schema element, in step S802, transformation of the template language element does not require comparison for similarity. Instead, a mapping relationship between two languages are pre-established according to the language specifications of the source template language and the target template language. Such mapping relationships may include mappings in aspects of object, function, operator, comparison, condition, circulation, and the like, besides the mapping of data type.

In the case that the target data schema elements to which respective data schema elements in the source web page have been mapped through steps S201-S203, or S201-S205, and the target template language elements into which the source templage language elements in the source web page have been obtained through steps S801-S802 of method 800, it would be easy to generate, in step S803, a target web page based on the target data schema elements and the template language elements. In this regard, the corresponding target web page may be automatically obtained based on the provided source web page, the provided target data schema, and the provided target template language, and other inputs, which may extremely enhance the transformation efficiency of the web page (in particular, the dynamic HTML page).

Figure 9:
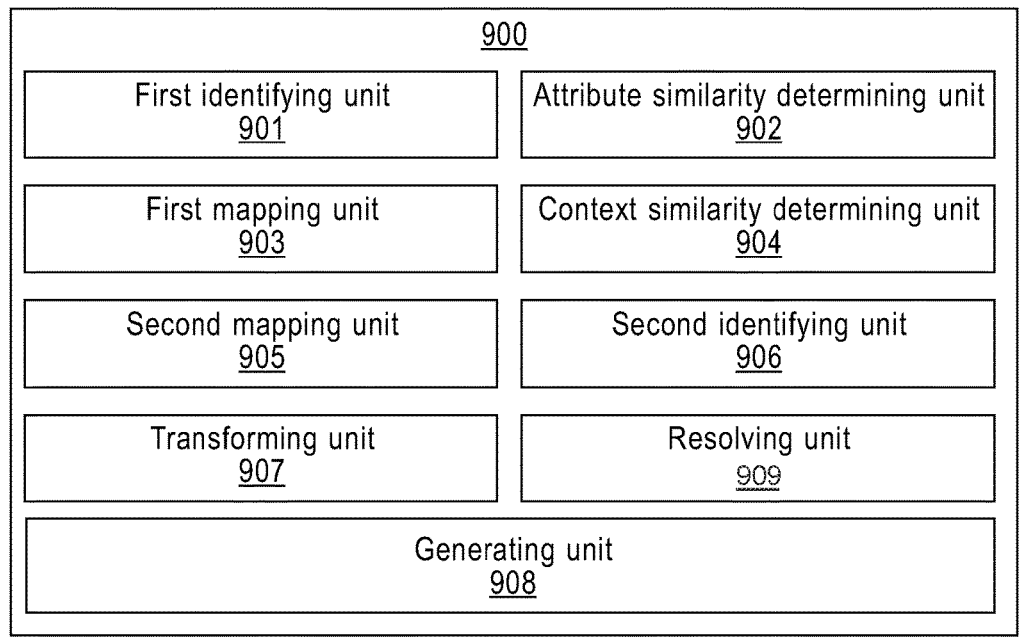
FIG. 9 shows an exemplary block diagram of an apparatus for processing a web page according to an exemplary embodiment of the present invention.

Next, a schematic block diagram of an apparatus 900 for processing a web page according to exemplary embodiments of the present invention will be described further with reference to FIG. 9.

As shown in the figure, the apparatus 900 comprises: a first identifying unit 901 configured to identify a plurality of source data schema elements of the web page; an attribute similarity determining unit 902 configured to determine an attribute similarity between one source data schema element among the plurality of source data schema elements and one target data schema element among a plurality of target data schema elements based on attributes of the data schema elements; and a first mapping unit 903 configured to map the source data schema element to the target data schema element for generating a target web page in response to the attribute similarity being higher than a predetermined threshold.

In an alternative embodiment of the present invention, the apparatus 900 may further comprise: a context similarity determining unit 904 configured to determine a context similarity between the source data schema element and the target data schema element based on the attributes and the context information of a data schema element in response to the attribute similarity being lower than the first predetermined threshold; and a second mapping unit 905 configured to map the source data schema element to the target data schema element in response to the context similarity being higher than the second predetermined threshold.

In an alternative embodiment of the present invention, the apparatus 900 further comprises a second identifying unit 906 configured to identify a plurality of source template language elements of the web page; a transforming unit 907 configured to transform the plurality of source template language elements into a plurality of target template language elements based on a predetermined mapping relationship; and a generating unit 908 configured to generate a target web page based on the plurality of target template language elements and the plurality of target data schema elements to which the plurality of source data schema elements of the web page are mapped.

In an alternative embodiment of the present invention, the attribute similarity between the source data schema element and the target data schema element is determined at least partially based on the following: a distance between each attribute in a set of attributes of the source data schema element and a set of attributes of the target data schema element, a distance between each attribute in a set of attributes of the target data schema element and a set of attributes of the source data schema element, and a character string length of the names of all attributes in the set of attributes of the source data schema element and the set of attributes of the target data schema element, wherein a distance between an attribute and a set of attributes is a minimum value in the edition distance between the attribute and each attribute in the set of attributes, and the edition distance between attributes is a minimum number of a single-character edits required to transform any attribute into another attribute.

In an alternative embodiment of the present invention, the attributes of a data schema element at least comprises one or more of the following: the attributes of the data schema element itself, and the attributes inherited thereby.

In an alternative embodiment of the present invention, the context information is at least based on one or more of the following: background information of the data schema element, and associated information.

In an alternative embodiment of the present invention, the apparatus 900 further comprises a resolving unit 909 configured to resolve the web page into a document object model so as to identify the source data schema element or the target data schema element.

In the alternative embodiment of the present invention, the web page is a dynamic HTML page.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a web page, comprising:
identifying a plurality of source data schema elements and a plurality of source template language elements of the web page;
determining an attribute similarity between a source data schema element among the plurality of source data schema elements and a target data schema element among a plurality of target data schema elements based on attributes of the data schema elements, wherein the attribute similarity between the source data schema element and the target data schema element is determined at least partially based on a character string length of the names of all attributes in a set of attributes of the source data schema element and a set of attributes of the target data schema element;
mapping the source data schema element to the target data schema element for generating a target web page in response to the attribute similarity being higher than a first predetermined threshold, wherein the mapping is at least partially based on the plurality of source template language elements;

determining a context similarity between the source data schema element and the target data schema element based on the attributes and the context information of a data schema element in response to the attribute similarity being lower than the first predetermined threshold;

transforming the plurality of source template language elements into a plurality of target template language elements based on a predetermined mapping relationship, wherein the predetermined mapping relationship comprises a mapping according to language specifications of a source template language and a target template language; and generating a target web page based on the plurality of target template language elements and the plurality of target data schema elements to which the plurality of source data schema elements of the web page are mapped.

2. The method according to claim 1, further comprising: mapping the source data schema element to the target data schema element in response to the context similarity being higher than a second predetermined threshold.

3. The method according to claim 2, wherein the context information is at least based on one or more of the following: background information of the data schema element, and associated information.

4. The method according to claim 1, wherein the attribute similarity between the source data schema element and the target data schema element is further determined at least partially based on the following:

a distance between each attribute in the set of attributes of the source data schema element and the set of attributes of the target data schema element, and a distance between each attribute in the set of attributes of the target data schema element and the set of attributes of the source data schema element;

wherein a distance between an attribute and a set of attributes is a minimum value in the edition distance between the attribute and each attribute in the set of attributes, and the edition distance between attributes is a minimum number of single-character edits required to change any attribute into another attribute.

5. The method according to claim 1, wherein the attributes of a data schema element at least comprises one or more of the following: the attributes of the data schema element itself, and the attributes inherited thereby.

6. The method according to claim 1, further comprising: resolving the web page into a document object model so as to identify the source data schema element or the target data schema element.

7. The method according to claim 1, wherein the web page is a dynamic HTML page.

8. A computer system for processing a web page, having a processor and a tangible non-transitory storage device; and a program embodied on the storage device for execution by the processor, the program having a plurality of program instructions to:

identify a plurality of source data schema elements and a plurality of source template language elements of the web page;

determine an attribute similarity between a source data schema element among the plurality of source data schema elements and a target data schema element among a plurality of target data schema elements based on attributes of the data schema elements, wherein the attribute similarity between the source data schema element and the target data schema element is determined at least partially based on a character string length of the names of all attributes in a set of attributes of the source data schema element and a set of attributes of the target data schema element;

map the source data schema element to the target data schema element for generating a target web page in response to the attribute similarity being higher than a first predetermined threshold, wherein the instructions to map are at least partially based on the plurality of source template language elements;

determine a context similarity between the source data schema element and the target data schema element based on the attributes and the context information of a data schema element in response to the attribute similarity being lower than the first predetermined threshold;

transform the plurality of source template language elements into a plurality of target template language elements based on a predetermined mapping relationship, wherein the predetermined mapping relationship comprises a mapping according to language specifications of a source template language and a target template language; and generate a target web page based on the plurality of target template language elements and the plurality of target data schema elements to which the plurality of source data schema elements of the web page are mapped.

9. The system according to claim 8, wherein the program instructions further comprise instructions to:

map the source data schema element to the target data schema element in response to the context similarity being higher than a second predetermined threshold.

10. The system according to claim 9, wherein the context information is at least based on one or more of the following: background information of the data schema element, and associated information.

11. The system according to claim 8, wherein the attribute similarity between the source data schema element and the target data schema element is further determined at least partially based on the following:

a distance between each attribute in the set of attributes of the source data schema element and the set of attributes of the target data schema element, a distance between each attribute in the set of attributes of the target data schema element and the set of attributes of the source data schema element;

wherein a distance between an attribute and a set of attributes is a minimum value in the edition distance between the attribute and each attribute in the set of attributes, and the edition distance between attributes is a minimum number of single-character edits required to transform any attribute into another attribute.

12. The system according to claim 8, wherein the attributes of a data schema element at least comprises one or more of the following: the attributes of the data schema element itself, and the attributes inherited thereby.

13. The system according to claim 8, wherein the program instructions further comprise instructions to:

resolve the web page into a document object model so as to identify the source data schema element or the target data schema element.

14. The system according to claim 8, wherein the web page is a dynamic HTML page.

15. A computer program product for processing a web page, comprising a tangible non-transitory storage device having program code embodied therewith, the program code executable by a processor of a computer to perform a method, the method comprising:
- identifying, by the processor, a plurality of source data schema elements and a plurality of source template language elements of the web page;
- determining, by the processor, an attribute similarity between a source data schema element among the plurality of source data schema elements and a target data schema element among a plurality of target data schema elements based on attributes of the data schema elements, wherein the attribute similarity between the source data schema element and the target data schema element is determined at least partially based on a character string length of the names of all attributes in a set of attributes of the source data schema element and a set of attributes of the target data schema element;
- mapping, by the processor, the source data schema element to the target data schema element for generating a target web page in response to the attribute similarity being higher than a first predetermined threshold, wherein the mapping is at least partially based on the plurality of source template language elements;
- determining, by the processor, a context similarity between the source data schema element and the target data schema element based on the attributes and the context information of a data schema element in response to the attribute similarity being lower than the first predetermined threshold;
- transforming, by the processor, the plurality of source template language elements into a plurality of target template language elements based on a predetermined mapping relationship, wherein the predetermined mapping relationship comprises a mapping according to language specifications of a source template language and a target template language; and
- generating, by the processor, a target web page based on the plurality of target template language elements and the plurality of target data schema elements to which the plurality of source data schema elements of the web page are mapped.

16. The computer program product of claim 15, wherein the method further comprises:
- mapping, by the processor, the source data schema element to the target data schema element in response to the context similarity being higher than a second predetermined threshold.

17. The computer program product of claim 15, wherein the attribute similarity between the source data schema element and the target data schema element is determined at least partially based on the following:
- a distance between each attribute in the set of attributes of the source data schema element and the set of attributes of the target data schema element, a distance between each attribute in the set of attributes of the target data schema element and the set of attributes of the source data schema element;
- wherein a distance between an attribute and a set of attributes is a minimum value in the edition distance between the attribute and each attribute in the set of attributes, and the edition distance between attributes is a minimum number of single-character edits required to transform any attribute into another attribute.

* * * * *